United States Patent
Nguyen

(10) Patent No.: US 8,717,666 B2
(45) Date of Patent: May 6, 2014

(54) COMPACT SOLID STATE ENTANGLED PHOTON SOURCE

(76) Inventor: Quant-Viet Nguyen, Richmond Heights, OH (US)

(*) Notice: Subject to any disclaimer, the term of this patent is extended or adjusted under 35 U.S.C. 154(b) by 0 days.

(21) Appl. No.: 13/113,458

(22) Filed: May 23, 2011

(65) Prior Publication Data

US 2011/0255150 A1 Oct. 20, 2011

Related U.S. Application Data

(62) Division of application No. 10/946,314, filed on Sep. 22, 2004, now abandoned.

(51) Int. Cl.
*G02F 1/35* (2006.01)
(52) U.S. Cl.
USPC ............................. 359/330; 372/21; 372/22
(58) Field of Classification Search
USPC ...................................... 372/21, 22; 359/330
See application file for complete search history.

(56) References Cited

U.S. PATENT DOCUMENTS

| | | | |
|---|---|---|---|
| 6,393,038 B1 * | 5/2002 | Raymond et al. | 372/22 |
| 7,211,812 B2 * | 5/2007 | Takeuchi | 250/493.1 |
| 2003/0123516 A1 * | 7/2003 | Steinberg et al. | 372/102 |

* cited by examiner

*Primary Examiner* — Tod T Van Roy
(74) *Attorney, Agent, or Firm* — Robert H. Earp, III

(57) ABSTRACT

A compact source of polarization-entangled photons includes a laser source, producing a laser beam, a pair of nonlinear crystals, in optical contact with each other, with one of the pair of nonlinear crystals having an input face, with the laser beam incident on the input face, and another of the pair of nonlinear crystals rotated 90°, along an axis perpendicular to the input face, with respect to each other and a fiber coupling point, configured to receive a pair of single-mode fibers. Pairs of polarization-entangled photons are produced through spontaneous parametric down conversion of the laser beam and provided to the fiber coupling point.

13 Claims, 4 Drawing Sheets

COMPACT SOLID STATE ENTANGLED PHOTON SOURCE

CROSS-REFERENCE TO RELATED APPLICATIONS

This application is a divisional of U.S. patent application Ser. No. 10/946,314, entitled COMPACT SOLID STATE ENTANGLED PHOTON SOURCE by the same inventor and having a filing date of Sep. 22, 2004 now abandoned.

ORIGIN OF THE INVENTION

The invention described herein was made by employees of the United States Government and may be manufactured and used by or for the Government for Government purposes without payment of any royalties thereon or therefore.

BACKGROUND OF THE INVENTION

1. Field of Invention

The present invention relates to production of specific types of light with a high degree of fourth-order coherence that can be used in certain systems. In particular, the present invention is directed to methods for creating entangled photons and source for producing those entangled photons. More specifically, the present invention produces polarization-entangled photons. The entangled photons may be beneficially used in communications, computing and other applications.

2. Description of Related Art

In the field of quantum information, quantum optics, quantum cryptography, and quantum communications, etc., there exists a need to generate entangled photon pairs. The entangled photon pairs are described by an inseparable wave equation such that if a measurement is performed on one photon, its other twin photon's state is completely determined. Such photon pairs are also described as having a high degree of fourth-order coherence. Fourth-order coherence occurs when two-photons that are highly correlated as a result of quantum entanglement are brought together and observed in coincidence; the quantum interference between the two particles will only be visible when viewed using time-coincident techniques. Without the fourth-order coherence, coherent interference effects are not observed. The problem up to now is that these sources of entangled photons require large, expensive and power-intensive Ar-ion lasers to generate light in the UV to pump a non-linear crystal, such as beta barium borate (BBC)), to produce spontaneous parametric down conversion (SPDC). The SPDC process generates a pair of photons (the signal and idler) whose momentum and energy sum up to equal the initial pump photon.

One such SPDC process is illustrated in FIG. 1. An incoming beam 101 is incident on the crystal 110 to produce pairs of photons 120. The photons produced form a spectrum with wavelengths centered around twice the wavelength of the incoming beam and form conical emissions based on the properties of the crystal. In the process illustrated, the polarizations of the produced photons are opposite to that of the incoming beam. Additionally, if two crystals are used, where one crystal is rotated 90° from the other, then polarization-entangled photons can be produced. Such a system is illustrated in FIG. 2. In that example, the incoming beam 201 is incident on a first crystal 210 coupled with a second crystal 212. The incident 201 is polarized linearly at an angle of 45 degrees with respect to one of the crystals 210 and 212. In this way a photon from the pump beam 201 has a equal probability of down-converting in either crystal 210 or 212. Since the crystals 210 and 212 are thin and located next to each other, the indistinguishability of which crystal actually provided the downconversion produces the polarization entanglement. The photons produced have polarizations oriented at 90° with each other, the optical axis of a first 222 lies in a vertical plane and the optical axis of the second 220 in a horizontal plane. Such systems are discussed, for example, in "Ultrabright source of polarization-entangled photons", P. G. Kwiat et al., *Physical Review A*, Vol. 60, No. 2, pp. 773-6, 1999.

However, in the prior art, such systems typically take up a great deal of space on a laboratory optical table, weigh several hundreds of pounds and consume tens of kilowatts of electrical power and require cooling water. Other problems of such systems are their rather inefficient conversion of electricity to usable QE photons. The power input to a 10 Watt Ar-ion laser is about 25 kW, while the final output SPDC photons is on the order of thousands of photons. A single photon per second has a power of about 1E-19 W. Thus, the power efficiency of conventional SPDC systems is only about 1E-23.

Prior art systems typically use a large gas Ar-ion laser to pump an externally mounted nonlinear crystal producing two QE photons at about 702 nm from a single 351 nm pump photon. Other devices, such as a high finesse optical cavity have been used to enhance the efficiency by a factor of 20 to 100. One main problem with the prior art is that the systems are bulky and very power intensive. Such prior art systems do not work well as a standard component in telecom, computer networking, field portable devices, or miniature nano-technology devices.

Recently, however, the use of blue 400 nm diode lasers to pump nonlinear crystals external to the pump laser has been described. See, for example, "Entangled photon apparatus for the undergraduate laboratory" D. Dehlinger et al., *Am. J. Phys.*, vol. 70, No. 9, pp. 898-902, 2002. However, such a system still requires large macro-size optical components, is sensitive to optical alignment and is not portable.

Thus, there is a need in the prior art for a system or reduced size to a level compatible with nanotechnology or at least micro-scale structures of cubic millimeter size. There is also a need for a system that may be produced at reduced cost and complexity by integrating everything onto a single monolithic component. There is also a need for a system that that is more robust and less sensitive to optical alignment than the prior art systems, so that it may be used in the field such as in telecom components or portable devices. There is also a need for a system that will consume very little electrical power (mW). There is also a need for a system that will improve efficiency by producing approximately thousands of entangled photons for mW of electrical input power; thus increasing the efficiency by about a million times over the conventional techniques.

SUMMARY OF THE INVENTION

According to one embodiment of the invention, a compact source of entangled photons is disclosed. The source includes a laser source, producing a laser beam, a pair of nonlinear crystals, in optical contact with each other, with one of the pair of nonlinear crystals having an input face, with the laser beam incident on the input face, and another of the pair of nonlinear crystals rotated 90°, along an axis perpendicular to the input face, with respect to each other and a fiber coupling point, configured to receive a pair of single-mode fibers. Pairs of entangled photons are produced through spontaneous parametric down conversion of the laser beam and provided to the fiber coupling point.

Additionally, the compact source may include a monolithic base to which the laser source, the pair of nonlinear crystals and the fiber coupling point are mounted. The source may also include a filter, positioned between the pair of nonlinear crystals and the fiber coupling point to filter light having a wavelength of the laser beam, wherein the filter can include at least one of a long-pass red glass filter, a laser stop and a dispersion element and/or a aspheric coupling lens pair, positioned between the pair of nonlinear crystals and the fiber coupling point to focus light produced through the spontaneous parametric down conversion of the laser beam. Also, the fiber coupling point may be configured to receive a pair polarization maintaining fibers.

Additionally, the optical contact between the pair nonlinear crystals may occur between contact faces of the pair of nonlinear crystals, with a contact face of the one of the pair of nonlinear crystals being on an opposite side of the one of the pair from the input face and the input face and a contact face of the another of the pair of nonlinear crystals may each have an antireflection coating. Also, the another of the pair of nonlinear crystals has a face, opposite to the contact face of the another of the pair, that may have a high reflection coating. The pair of nonlinear crystals comprise crystals that may be formed from, but not limited to, beta barium borate (BBO). The laser source may be a laser producing laser light having a wavelength of approximately 404 nm and/or a InGaN semiconductor laser diode.

According to another embodiment, a method of producing entangled photons is disclosed. The steps of the method include introducing a laser beam from a laser source to a pair of nonlinear crystals in optical contact with each other, with one of the pair of nonlinear crystals having an input face, with the laser beam incident on the input face, and another of the pair of nonlinear crystals rotated 90°, along an axis perpendicular to the input face, with respect to each other and coupling pairs of entangled photons produced through spontaneous parametric down conversion of the laser beam to a fiber coupling point, configured to receive a pair of single-mode fibers.

According to another embodiment, a system for producing entangled photons is disclosed. The system includes lasing means for producing a laser beam, introducing means for introducing the laser beam to a pair of nonlinear crystals in optical contact with each other, with one of the pair of nonlinear crystals having an input face, with the laser beam incident on the input face, and another of the pair of nonlinear crystals rotated 90°, along an axis perpendicular to the input face, with respect to each other and coupling means for coupling pairs of entangled photons produced through spontaneous parametric down conversion of the laser beam to a fiber coupling point, configured to receive a pair of single-mode fibers.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures.

DETAILED DESCRIPTION OF PREFERRED EMBODIMENTS

According to several embodiments, proposed designs for miniature, solid-state, sources of polarization and momentum, entangled photons that require very low power are described. Such source devices are critical components for the practical implementation of quantum communications, quantum cryptography, quantum key distribution, quantum computation, quantum imaging, quantum sensing, etc. As all of these emerging technologies have a distinct and immediate need for a compact and reliable source of high-brightness entangled photon pairs. Currently, there is no compact, rugged, field-deployable device on the market that can provide high-brightness entangled photon pairs while requiring only milliwatts of electrical power.

According to at least one embodiment, the present invention device will be able to produce a continuous source of approximately 80,000 to 8,000,000 polarization entangled photon pairs per second while requiring only milliwatts of electrical power. In preferred embodiments, the present invention produces polarization and momentum entangled photon pairs near 800 nm in wavelength (the peak of detection sensitivity for Si-based, Geiger-mode avalanche photodiode detectors), making it compatible with the existing state-of-the-art in single photon detection devices. Furthermore, the source devices of the present invention can be directly fiber optically coupled (pigtailed) for convenience. In preferred embodiments, the rugged monolithic construction of the source devices permits those devices to be used in harsh environments. Additionally, the solid-state and monolithic construction, used in many embodiments, enables the use of cost-effective batch-manufacturing techniques.

Figure 1:
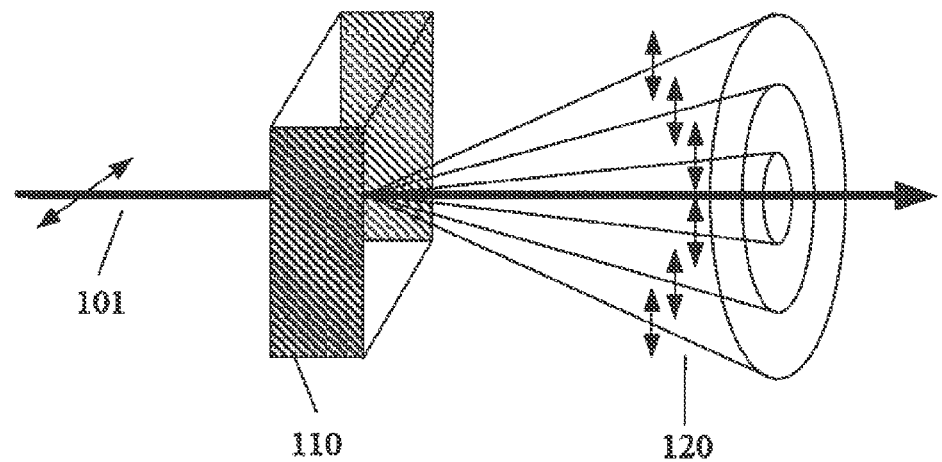
FIG. 1 provides an example of an apparatus for producing photons through spontaneous parametric down conversion.
Figure 2:
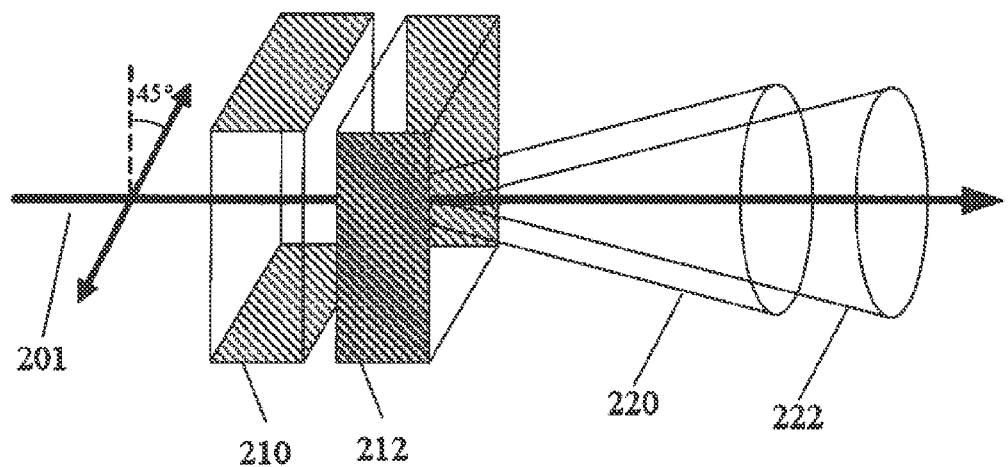
FIG. 2 provides an example of an apparatus utilizing two crystals for producing photons through spontaneous parametric down conversion.
Figures 3A, 3B:
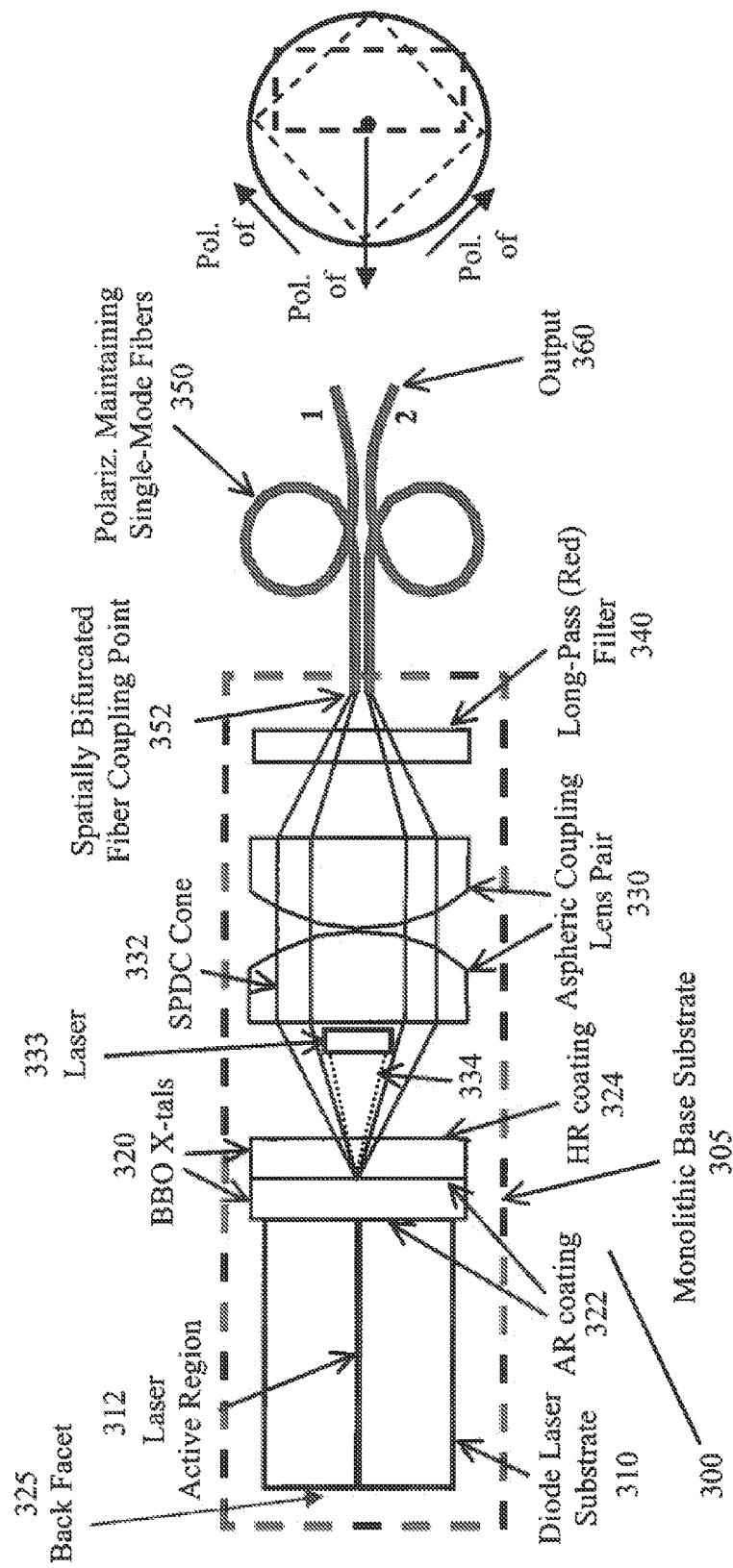
FIG. 3 illustrates a schematic of a compact source of entangled photons, with FIG. 3(a) providing a top view and FIG. 3(b) providing an end view, according to one embodiment of the present invention.

According to one embodiment, a compact solid-state source 300 is described and illustrated in FIG. 3. As discussed above, the source is preferably mounted on a monolithic base substrate 305. In FIG. 3(a), the source utilizes a laser diode 310, having an active laser region 312. The laser diode is, in preferred embodiments, a blue (InGaN or other) diode laser operating at an approximate wavelength of 404 nm. The source includes a pair of orthogonally aligned type-I nonlinear BBO crystals 320, cut with the crystal axis at 29 deg with respect to the crystal input faces. The crystal pair, in optical contact with one another, is placed intra-cavity to the diode laser with the output crystal face forming the laser cavity output coupler. Although a BBO nonlinear crystal is described in the present embodiments, the use of other nonlinear crystals that have a high degree of optical transmission at wavelengths near the laser fundamental (near 404 nm) and the SPDC output wavelength (near 808 nm), such as potassium titanyl phosphate (KTP) may also be used. It is understood that the crystal cut angles will then be adjusted to be commensurate with the phase-matching conditions dictated by the crystal in use for type-I SPDC generation.

The output facet of the diode laser is first coated with an anti-reflection (AR) coating 322 and the BBO crystals are placed in contact with the AR coated diode facet, with the remaining face of the BBO crystal coated for high reflection (HR) 324 at wavelengths ranging from 395 nm to 410 nm, based on the light source. In a preferred embodiment, the HR coating reflects light at 404 am to form the output coupler but transmitting at 808 nm. In this way, a monolithic solid-state means of providing a high intra-cavity photon flux to the BRO crystal for the efficient generation of SPDC photons ranging from 790 nm to 820 nm is provided, with 808 nm being the wavelength shown in the preferred embodiment. It is noted that 808 nm is a wavelength of SPDC photons in a preferred embodiment, but the transmission properties may be varied based on the coating used. Although not required for operation, note that a HR coating may also be applied to the back facet 325 of the diode laser to increase the intra-cavity photon flux even higher.

The source device is insensitive to optical misalignment because everything is bonded together at the micro-scale to a monolithic substrate 305. By placing the BBO crystals intra-cavity, a power enhancement of about 100 to 1000 achieved, depending on the quality of the AR coating and the quality of the high reflectivity output coupler on the BBO crystal output face. Two thin type-I BBO crystals in a orthogonal polarization orientation may be used to generate high levels of polarization entangled photons.

This technique has the input polarization of the diode laser oriented at 45 degrees with respect to the non-linear crystals to achieve entanglement generation. This can be accomplished by simply mounting the crystal pair at a 45 degree orientation or through an intra-cavity retardation waveplate to rotate the laser polarization. The crystals produce two spatially superimposed cones of SPDC light. The photons from one cone are entangled with the photons from the second cone through polarization states. That is, the polarization states can be described by the following wave function $$\frac{1}{\sqrt{2}}(|H_1, H_2\rangle \pm |V_1, V_2\rangle),$$

so that the photon pairs always have unknown but identical polarization states.

The SPDC light cones 332 are then optically coupled into two polarization maintaining optical fibers 350, located in close spatial proximity to one another via lens coupling. This coupling is partially accomplished through the of an aspheric coupling lens pair 330. The spatially bifurcated point 352 where the two fiber input launch faces are located reduce the collection efficiency of the SPDC cones by some amount (assumed to be 10% throughput). However, the photon pairs launched into the optical fibers are polarization entangled by being spatially separated at diametrically-opposed locations along the SPDC ring formed by the cones of light. The main laser emission cone 334, shown by the dotted line is prevented from reaching the fiber launch point 340 through the use of a physical laser emission stop 333 which would preferably be made of a highly absorbing black and heat dissipative material. The beam stop 333 can be directly mounted on either of the aspheric lenses 330, or in between them in such a way that it obscures the main laser emission, yet permits the transmission of the SPDC light cone 332 since they have a wider divergence angle. The residual blue laser light that is not blocked by the beam stop 333 may be filtered using the following optical elements or combinations thereof: a long-pass red glass filter, a multi-layer thin film interference filter, a holographic volume phase laser line rejection filter, an atomic or molecular absorption filter, or the like, prior to the fiber launch point. 340. The relative polarizations of the incident and output photons are illustrated in FIG. 3(b).

Figure 4:
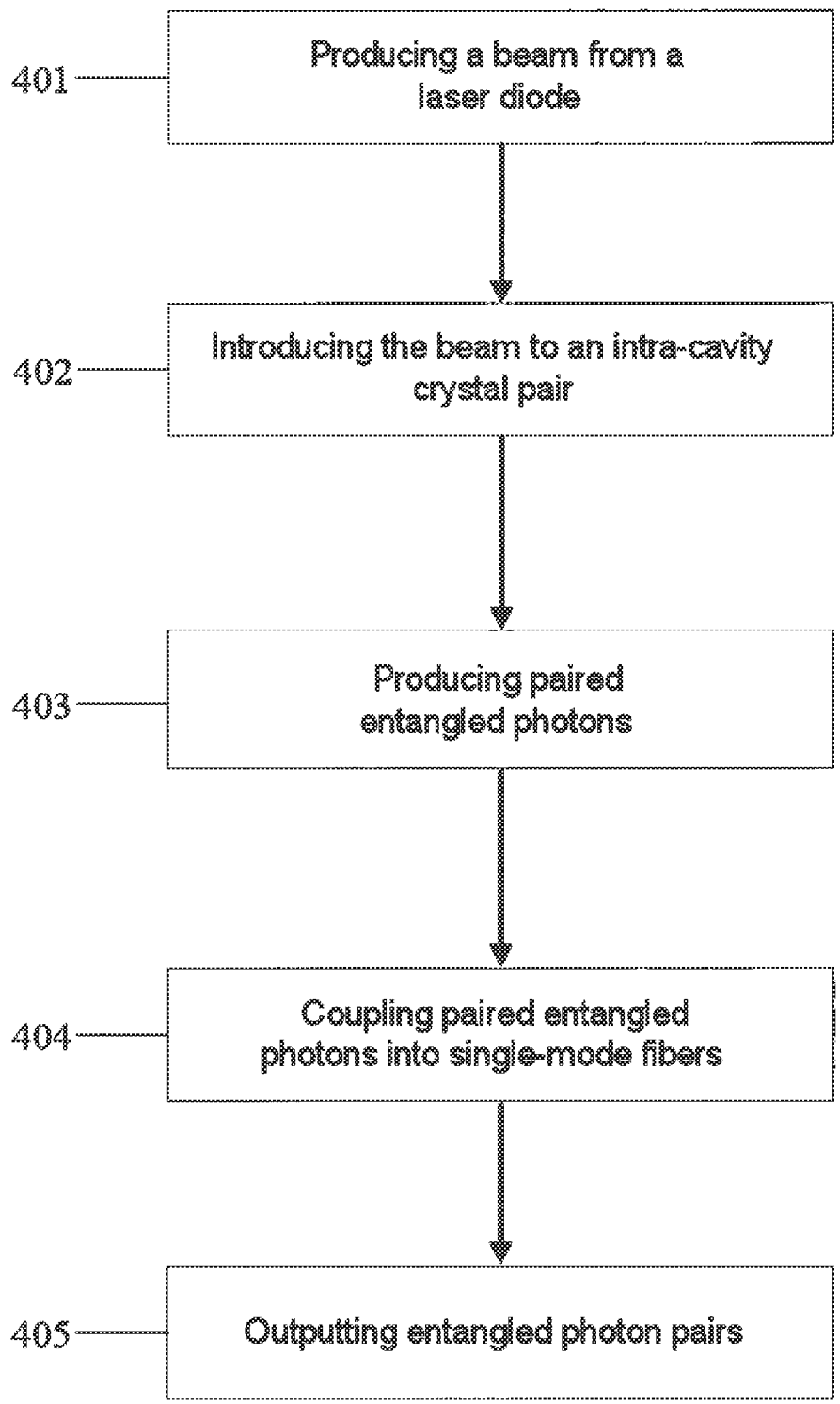
FIG. 4 illustrates a flowchart illustrating the process of creating entangled photons, according to one embodiment of the present invention.

A general process of producing the entangled photons, according to certain embodiments of the present invention, is illustrated in FIG. 4. Step 401, a laser beam is produced through a laser diode. That beam is introduced into an intra-cavity crystal pair, according to step 402, and paired entangled photons are produced, in step 403. Thereafter, in step 404, the entangled photons are coupled into single-mode fibers and those photons are eventually output, in step 405.

According to many embodiments, the present invention provides a compact source requiring less than 1 cubic cm of volume, a monolithic construction of optical components so that optical misalignment is not a problem and is diode laser based, thus requiring very low electrical power to operate. In many embodiments, the present invention produces output photons near 800 nm in wavelength which is compatible with the peak detection sensitivity of Si avalanche photodiodes, only requires a one-time alignment during the fabrication process and allows for fabrication that can be automated into a batch process.

One important aspect of the present invention is the amplification of a photon flux by placing an optical element inside an optical cavity. The optical cavity in this case is the actual diode laser itself. To get a diode laser to operate in an external cavity configuration, the output facet of the diode should first be coated with an AR thin-film using sputtering, molecular beam epitaxy (MBE) or other deposition techniques. The AR coating serves to prevent laser action within the diode laser chip itself The active non-linear crystal, BBO in preferred embodiments, is then AR coated on the facet adjacent to the AR coated output facet of the diode laser and is high reflective coated on the other face at the lasing wavelength of the diode laser. In this way, optical power circulates and is permitted to build up within the new external cavity, comprising the diode laser and the non-linear crystal. The power buildup factor depends on the quality factor (Q), or finesse of the optical cavity, which can routinely be a factor of 100 to 1000 times greater than the output power of the laser itself This power buildup and permits a 100 to 1000× gain in the generation of entangled photon pairs generated by the non-linear crystal. The fact that the cavity consists of the diode laser chip placed in optical contact with the non-linear crystal ensures proper alignment and keeps the device small.

The system of the present invention works similarly as optically contacted laser-non-linear chip systems currently available on the commercial market such as diode pumped Nd:YVO$_4$ Lasers in optical contact with KDP non-linear crystals that produce 532 nm green light by frequency doubling the 1064 nm output of the Nd:YVO$_4$ lasing active medium. Other examples of this type of technology include optically contacted passive Q-switch thin films that are deposited directly onto the lasing active medium. Alternatively, the components can be mounted on a monolithic base, interconnected with optical waveguides, much like master oscillator/amplifier diode laser systems. The optical waveguides serve to constrain the optical field to a narrow spatial profile, preserving the coherence and high power density required for efficient SPDC production in the non-linear crystal.

In many embodiments of the present invention, a value of 10,000 entangled photon pairs per second per mW (over a 5 nm bandwidth) is possible if all photons are collected from the SPDC cone using two 0.59 mm thick type-I, crossed non-linear BBO crystals. Assuming only a 10% coupling efficiency into optical fibers yields 1000 entangled photon pairs per mW. Assuming a reduction of 0.167× for using thinner 0.1 mm thick BBO crystals reduces this value to 167 entangled photon pairs per second per mW, With a conservative intracavity enhancement of 100×, for a 5 mW diode laser provides 500 mW×167 photon pairs per second. This yields about 83,500 entangled photon pairs per second from this type of compact entangled photon source. This performance is more than adequate for many quantum communications, cryptography or quantum computation requirements. By using high reflectance coatings to increase the cavity finesse, a factor of 10× to 100× is achievable, which yields up to about 8 million entangled photon pairs per second. Note that a 5 mW diode laser requires about 10 mW of input electrical power. Previous systems using Ar-ion lasers would require about 25 kW of power to produce the same number of entangled photon pairs.

Figure 5:
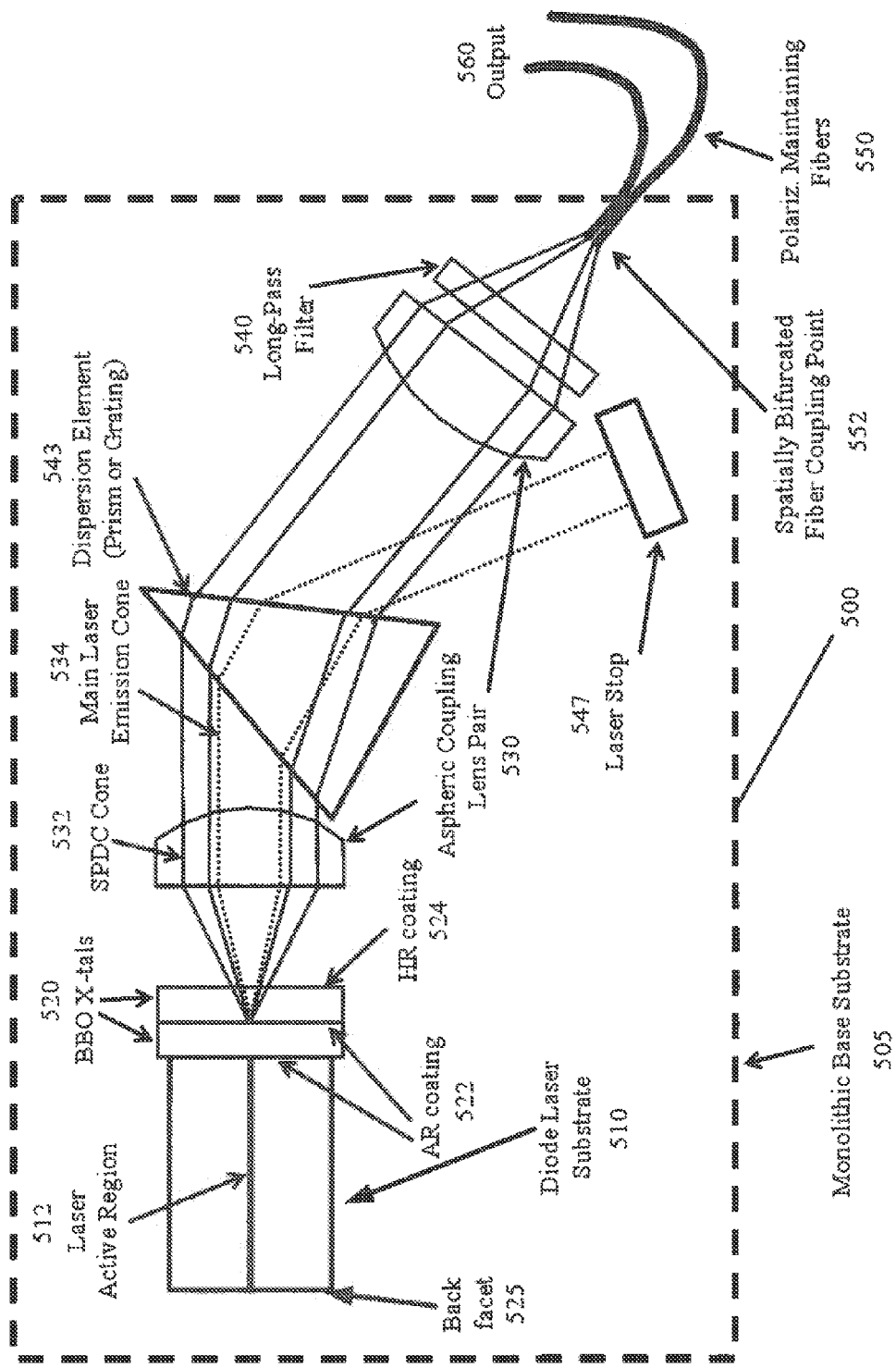
FIG. 5 illustrates a schematic of a compact source of entangled photons, according to an alternate embodiment of the present invention.

In an alternate embodiment of this system shown in FIG. 5, with the system is identified by 500. The system includes a source, such as a laser diode 510 having an active region 512, that is preferably mounted on a monolithic base substrate 505. The system includes a pair of orthogonally aligned type-I nonlinear BBO crystals 520, with AR coatings 522 and HR coating 524. Again, note that an optional HR coating may be applied to the back facet 525 of the diode laser to increase the intra-cavity photon flux even higher. In this alternate embodiment, a wavelength dispersive device 543 may be placed in the collimated portion of the beam path located in between the coupling lens pair 530 to achieve a spatial separation of the main laser wavelength emission 534 and the SPDC light emission cone 532. The spatially separated laser emission may then be blocked and absorbed using a highly absorbing beam stop 520. In this way, the amount of residual light that has to be blocked by the long pass filter element 540 is greatly reduced. The dispersion element 510 may be, but not limited to, a dispersion prism, a transmission grating (ruled or holographic), or a volume phase holographic grating, or any combination thereof. Such combinations of a series of prisms or gratings or grating/prisms (GRISM) are often used to achieve a high degree of wavelength dispersion in a compact space.

There is expected to be an increasing demand for compact and reliable sources of entangled photon pairs as the emerging fields of quantum cryptography, computation, and sensing evolve. In today's environment, where information security and privacy over the Internet are of great importance, there is a need for this a source device according to embodiments of the present invention.

In the embodiments of the invention discussed above, the invention seeks to reduce the size, cost, and complexity of SPDC entangled photon sources to monolithic, solid-state devices that consume very little electrical current (mA's) and occupy several cubic millimeters of volume. It should be understood that embodiments that only accomplish some of these benefits are also within the scope of the present invention.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A miniature, solid-state, compact source of entangled photons comprising:
   a laser source to produce a laser beam;
   a pair of nonlinear crystals in physical contact along mutually confronting optical surfaces, with one of the pair of nonlinear crystals having an input face with the laser beam incident thereon and the other of the pair of nonlinear crystals having an output face and rotated 90°, along an axis perpendicular to the input face;
   a high reflection coating on the output face, wherein as the laser beam exits the high reflection coating, the laser beam comprises a spatially separated laser emission and an spontaneous parametric down conversion (SPDC) light emission;
   a wavelength dispersive device to block the spatially separated laser emission and redirect the SPDC light emission;
   a fiber coupling point, configured to receive the SPDC light emission; and
   a monolithic base substrate to which the laser source, the pair of nonlinear crystals and the fiber coupling point are mounted so at to establish and preserve alignment during manufacture; and
   wherein the miniature, solid-state compact source of entangled photons requires only milliwatts of electrical power for operation.

2. The compact source as recited in claim 1, further comprising a filter, positioned between the pair of nonlinear crystals and the fiber coupling point to filter light having a wavelength of the laser beam, wherein the filter comprises at least one of a long-pass red glass filter, a laser stop and a dispersion element.

3. The compact source as recited in claim 1, further comprising a aspheric coupling lens pair, positioned between the pair of nonlinear crystals and the fiber coupling point to focus light produced through the spontaneous parametric down conversion of the laser beam.

4. The compact source as recited in claim 1, wherein the fiber coupling point is further configured to receive a pair polarization maintaining fibers.

5. The compact source as recited in claim 1, wherein the pair of nonlinear crystals comprise crystals formed from beta barium borate.

6. The compact source as recited in claim 1, wherein the laser source comprises a laser producing laser light having a wavelength of approximately 404 nm.

7. The compact source as recited in claim 1, wherein the laser source comprises a InGaN semiconductor laser diode.

8. A method of producing entangled photons using a miniature, solid-state component, comprising the steps of:
   introducing a laser beam from a laser source to a pair of nonlinear crystals in physical contact along mutually confronting optical surfaces, with one of the pair of nonlinear crystals having an input face with the laser hewn incident thereon and the other of the pair of nonlinear crystals having an output face and rotated 90°, along an axis perpendicular to the input face;
   providing a high reflection coating on the output face such that as the laser beam exits the high reflection coating the laser beam comprises a spatially separated laser emission and an spontaneous parametric down conversion (SPDC) light emission;
   blocking, the spatially separated laser emission and redirecting the SPDC light emission with a wavelength dispersive device; and
   receiving the SPDV light emission through a fiber coupling point wherein the laser source, the pair of nonlinear crystals and the fiber coupling point are mounted to a monolithic base substrate so at to establish and preserve alignment during manufacture, wherein the miniature, solid-state component requires only milliwatts of electrical power for operation.

9. The method of producing entangled photons as recited in claim 8, further comprising the step of filtering light produced through spontaneous parametric down conversion of the laser beam through at least one of a long-pass red glass filter, a laser stop and a dispersion element prior to the coupling step.

10. The method of producing entangled photons as recited in claim 8, wherein the step of coupling pairs of entangled photons comprises coupling pairs of entangled photons through a pair of aspheric coupling lens.

11. The method of producing entangled photons as recited in claim 8, wherein the step of introducing a laser beam from a laser source to a pair of nonlinear crystals comprises introducing the laser beam to the pair of nonlinear crystals through antireflective coatings on front faces of the pair of nonlinear crystals.

12. The method of producing entangled photons as recited in claim 8, wherein the step of introducing a laser beam from a laser source to a pair of nonlinear crystals comprises introducing the laser beam to the pair of nonlinear crystals formed from beta barium borate.

13. The method of producing entangled photons as recited in claim 8, wherein the step of introducing a laser beam from a laser source to a pair of nonlinear crystals comprises introducing the laser beam from a laser producing laser light having a wavelength of approximately 404 nm.

\* \* \* \* \*

UNITED STATES PATENT AND TRADEMARK OFFICE
CERTIFICATE OF CORRECTION

PATENT NO.        : 8,717,666 B2
APPLICATION NO.   : 13/113458
DATED             : May 6, 2014
INVENTOR(S)       : Quang-Viet Nguyen It is certified that error appears in the above-identified patent and that said Letters Patent is hereby corrected as shown below:

On the Title Page, Item (76), the correct spelling of the inventor's name is Quang-Viet Nguyen.

Signed and Sealed this
Twenty-third Day of September, 2014

Michelle K. Lee
*Deputy Director of the United States Patent and Trademark Office*